United States Patent [19]

Shinozaki et al.

[11] Patent Number: 4,560,278
[45] Date of Patent: Dec. 24, 1985

[54] FIXED-SLIT TYPE PHOTOELECTRIC MICROSCOPE

[75] Inventors: Toshiaki Shinozaki, Yokohama; Ichiro Mori, Tokyo, both of Japan

[73] Assignee: Tokyo Shibaura Denki Kabushiki Kaisha, Kawasaki, Japan

[21] Appl. No.: 513,452

[22] Filed: Jul. 13, 1983

[30] Foreign Application Priority Data

Aug. 25, 1982 [JP] Japan ................... 57-147054

[51] Int. Cl.$^4$ .................................. G01B 11/00
[52] U.S. Cl. ........................... 356/364; 356/400
[58] Field of Search ............... 356/364, 368, 399, 400, 356/401

[56] References Cited

U.S. PATENT DOCUMENTS

| | | | |
|---|---|---|---|
| 3,502,415 | 3/1970 | Hock | 356/399 X |
| 3,943,359 | 3/1976 | Matsumoto et al. | 356/400 X |
| 3,990,798 | 11/1976 | White | 356/401 |

OTHER PUBLICATIONS

Proc. of International Conf. on Microlithography, Microcircuit Engineering '80 (1980), p. 181.

Primary Examiner—Davis L. Willis
Assistant Examiner—Matthew W. Koren
Attorney, Agent, or Firm—Oblon, Fisher, Spivak, McClelland & Maier

[57] ABSTRACT

A fixed-slit type photoelectric microscope comprises an irradiation system for irradiating a linear pattern with light beam, an objective for forming an image of the linear pattern, a single slit disposed at a point conjugate to the linear pattern with respect to the objective, a photoelectric conversion element for converting the light beam from the slit into an electrical signal, a rectifying circuit for rectifying an electrical signal from the photoelectric conversion element, and an indicator for visualizing the rectified signal. The irradiation system generates a pair of polarized light beams with planes of polarization orthogonal to each other and alternately illuminates the linear pattern with the pair of polarized light beams at fixed periods. For deflecting the pair of polarized light beams from the linear pattern in different directions, an optical deflecting element is provided between the linear pattern and the slit. Different portions of the slit are illuminated by the pair of polarized light beams deflected by the optical deflecting elements.

18 Claims, 12 Drawing Figures

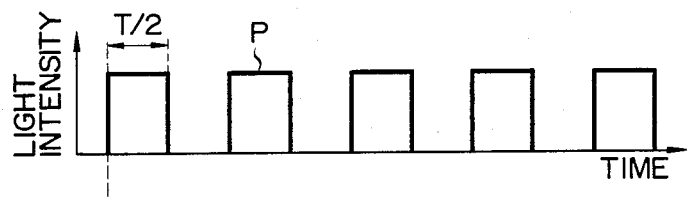
FIG. 2A
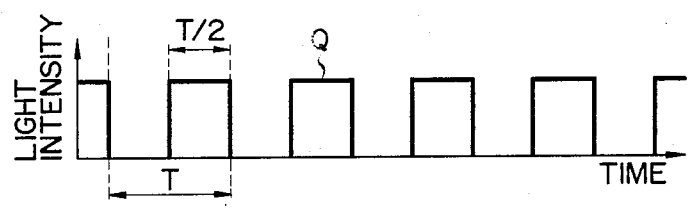
FIG. 2B
FIG. 3
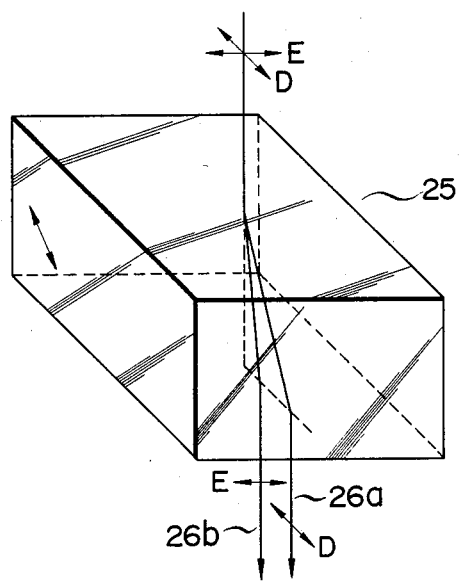

FIXED-SLIT TYPE PHOTOELECTRIC MICROSCOPE

BACKGROUND OF THE INVENTION

The present invention relates to a fixed slit type photoelectric microscope for detecting a position of a linear pattern on an object.

Various types of photoelectric microscopes for optically detecting a position of a linear pattern have been proposed. A vibration type photoelectric microscope is disclosed in "Photoelectric Microscope" by S. Sasayama, Nikon Tech. J., No. 2, pp. 24–32, and in Japanese Patent Publication No. 52-46694 by S. Sasayama. In this photoelectric microscope, a luminous flux transmitted through a slit is modulated by mechanically vibrating a slit on which a linear pattern (scale lines) disposed on an object under inspection is formed. The modulated luminous flux is received and converted into an electrical signal by a photoelectric conversion element. This electrical signal is amplified by a preamplifier and rectified by a synchronous rectifier. The rectifying signal is displayed by an indicating instrument as a displacement of the linear pattern on the object under inspection. In the photoelectric microscope, since the luminous flux received by a photoelectric conversion element is modulated, use of an AC amplifier is possible. Accordingly, an SN ratio of the detected output can be improved.

In a conventional photoelectric microscope in which the slit is mechanically vibrated, the center of the vibration becomes displaced over a period of time. Therefore, the detection accuracy is limited within the range of this displacement.

An apparatus designed to overcome this disadvantage is disclosed in "Double Diffraction Gratings As Keys for High Contrast Alignment on Wafer Steppers", by G. Dubroeucq et al., Proc. of International Conf. on Microlithography, Microcircuit Engineering 1980, pp. 181–190. This device detects a displacement of an alignment mark of double diffraction gratings on a wafer with respect to the center position of a multi-slit on a reticle mask. A luminous flux incident on a photoelectric conversion element is modulated using an acoustooptic modulator. Therefore, it is possible to prevent the displacement of the center of the mechanical vibration. However, it is difficult to adjust the apparatus since it employs a double diffraction for the detection of the alignment mark. In other words, in this apparatus, the pitch of the multi-slit must be exactly coincident with a value which is the product of the pitch of the alignment mark and a lens magnification. Further, it is difficult to form both the alignment mark and the multi-slit.

SUMMARY OF THE INVENTION

An object of the present invention is to provide a fixed-slit type photoelectric microscope which can detect a position of a linear pattern on an object under inspection with a high accuracy without degrading its detecting accuracy due to a mechanical vibration of a slit, for example.

Another object of the present invention is to provide a fixed-slit type photoelectric microscope which is easily adjustable.

These and other objects have been attained by the fixed-slit type photoelectric microscope for inspecting an object which comprises: irradiation element for irradiating a linear pattern of the object alternately by a pair of polarized light beams having planes of polarization orthogonal to each other; image formation element for forming an image of the linear pattern by the pair of polarized light beams illuminating the linear pattern; optical deflection element for deflecting the pair of polarized light beams passed through the image formation element in different directions; single slit fixed at a point conjugate to the linear pattern with respect to the image formation element, different portions of the slit being alternately illuminated by the pair of polarized light beams deflected by the optical deflection element; photoelectric conversion element for converting the pair of polarized light beams transmitted through the slit into an electrical signal; synchronous rectifying circuit for rectifying the electrical signal from the photoelectric conversion element in synchronism with the alternate irradiation of the pair of polarized light beams by the irradiation element, thereby producing a rectified signal; and indicator for visualizing the rectified signal.

With such an arrangement, the light input into the photoelectric conversion element can be modulated without mechanical vibration. Therefore, degradation of the detection accuracy due to mechanical vibration can be prevented. Further, since double diffraction is not used, adjustments for the operation of the photoelectric microscope can be easily made.

BRIEF DESCRIPTION OF THE DRAWINGS

These and other objects and advantages of the invention will be apparent from the following description taken in conjunction with the accompanying drawings, in which:

FIGS. 2A and 2B show signal waveforms illustrating a time variation of polarized light beam for illumination in the embodiment of FIG. 1;

FIG. 3 shows a diagram illustrating the operation of an optical deflecting element used in the embodiment of FIG. 1;

DETAILED DESCRIPTION OF THE PREFERRED EMBODIMENTS

Figure 1:
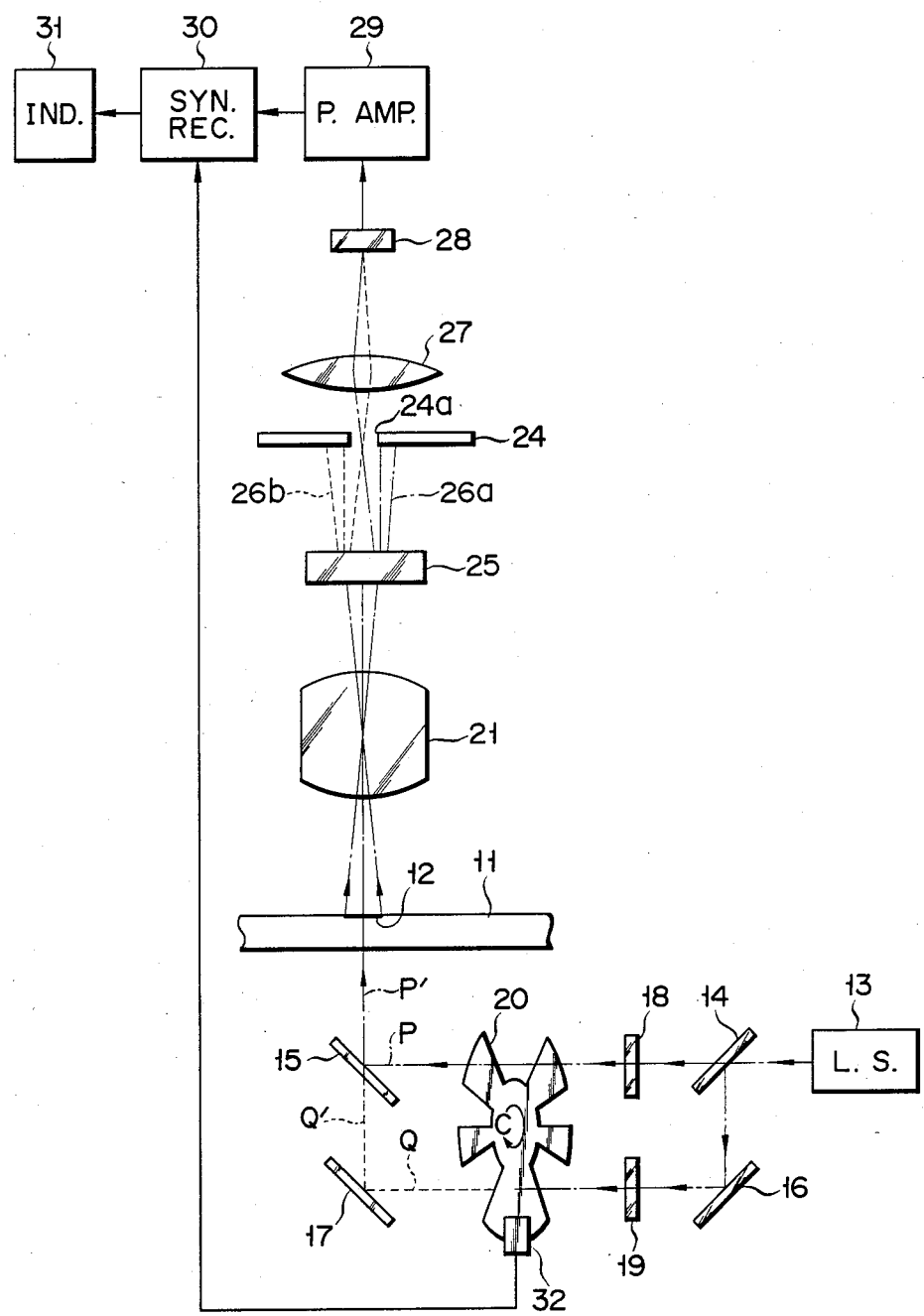
FIG. 1 shows a schematic diagram of a first embodiment of a fixed-slit type photoelectric microscope according to the present invention.

A first embodiment of a photoelectric microscope according to the present invention will be described with reference to FIG. 1. In the figure, reference numeral 11 designates a scale plate with a train of marks or gradations (linear pattern), which is made of a transparent material. Provided under the scale plate 11 is an irradiating mechanism composed of a light source 13, half mirrors or semi-transparent mirrors 14 and 15, reflecting mirrors 16 and 17, polarizing plates 18 and 19, and a chopper 20. In the irradiating mechanism, a light beam emitted from the light source 13 is applied through the half mirror 14 to the polarizing plate 18, and through the half mirror 14 and the reflecting mirror 16 to the polarizing plate 19. The polarizing plates 18 and 19 are disposed with the polarizing directions being orthogonal to each other. The pair of light beams linearly polarized in these directions are applied to the chopper 20 which is an opaque disc with cutaway portions peripherally arranged at fixed intervals. By rotating the chopper 20 in the direction C, the pair of linearly polarized light beams P and Q are chopped at fixed periods T, as shown in FIGS. 2A and 2B. The polarized light beams P and Q chopped by the chopper 20 are passed through the half mirror 15 and through the reflecting mirror 17 and half mirror 15 to irradiate the linear pattern 12. The pair of light beams which have been alternately polarized orthogonal to each other alternately hit the linear pattern 12 on the scale plate 11.

An objective 21, disposed above the scale plate 11, forms an image of the linear pattern 12 on the scale plate 11 on a slit 24a of a slit plate 24. An optical deflection element 25, for example, a Savart plate, is disposed on an optical axis of the objective 21 ranging from the objective 21 to the slit plate 24. The optical deflection element 25 is an optical crystal with a double refraction disposed in a given direction, as shown in FIG. 3. A luminous flux linearly polarized in a direction D parallel to a predetermined direction which is inherent to the optical deflection element 25, and a luminous flux linearly deflected in a direction E orthogonal to the direction D, are refracted differently and travel through different optical paths 26a and 26b. The polarizing directions of the polarized light beams are selected so as to be coincident with the polarizing directions of the luminous fluxes alternately illuminating the linear pattern 12 on the scale plate 11 via the irradiation mechanism. More particularly, the polarizing direction of the polarized light beams P' formed by passing the polarized light beams P through the half mirror 15 is coincident with the polarizing direction D. The polarizing direction of the polarized light beams Q' obtained by reflecting the polarized light beams Q in the reflecting mirror 17 is coincident with the polarizing direction E. Accordingly, the polarized light beams P' and Q' after passing the optical deflection element 25 take different optical paths to illuminate the slit 24a of the slit plate 24. More precisely, the polarized light beam P' passes along the right optical path 26a, is transmitted through the slit 24a of the slit plate 24, and is focused on a photoelectric conversion element 28 after passing a condenser lens 27. Similarly, the polarized light beam Q' passes through the left optical path 26b and reaches the photoelectric conversion element 28 through the slit 24a and the condenser lens 27.

An electrical signal converted by the photoelectric conversion element 28 is supplied to a synchronous rectifier 30 after being amplified by a preamplifier 29. The synchronous rectifier 30 rectifies the input signal in synchronism with the timings of the alternating illumination of the pair of polarized light beams coming from the irradiation mechanism. The output signal of the synchronous rectifier 30 is displayed, by an indicating instrument 31, in the form of a displacement of the linear pattern 12 on the scale plate 11. Reference numeral 32 designates a photointerruptor mounted on the chopper 20 for detecting the timings of the alternating illumination of the polarized light beams P and Q by the chopper 20. The chopper 20 supplies a reference signal to the synchronous rectifier 30.

With such an arrangement, through the alternating illumination of the pair of polarized light beams P' and Q' linearly polarized in orthogonal directions and the optical deflection element 25, a luminous flux (containing position information) emitted from the linear pattern 12 on the scale plate 11 alternately passes through the optical paths 26a and 26b, the slit 24a and the condenser lens 27, and reaches the photoelectric conversion element 28. When viewed from the photoelectric conversion element 28, this is equivalent to a case in which the single slit 24a corresponding to a position detecting point is mechanically vibrated. Accordingly, the displacement of the linear pattern 12 on the scale plate 11 can be detected.

Further, no mechanical vibrator is required to modulate a luminous flux incident on the photoelectric conversion element 28, thereby eliminating the displacement of a vibrating center caused by the mechanical vibration. Therefore, it is possible to detect the position of the linear scale 12 on the scale plate 11 with high precision. Experiments conducted by the inventors shows that an extremely precise position detection of 0.01 $\mu$ could be attained. This procedure for position detection is not complicated. Further, the adjustment of the photoelectric microscope is very easy compared with the photoelectric microscope utilizing the double diffraction system.

Figure 4:
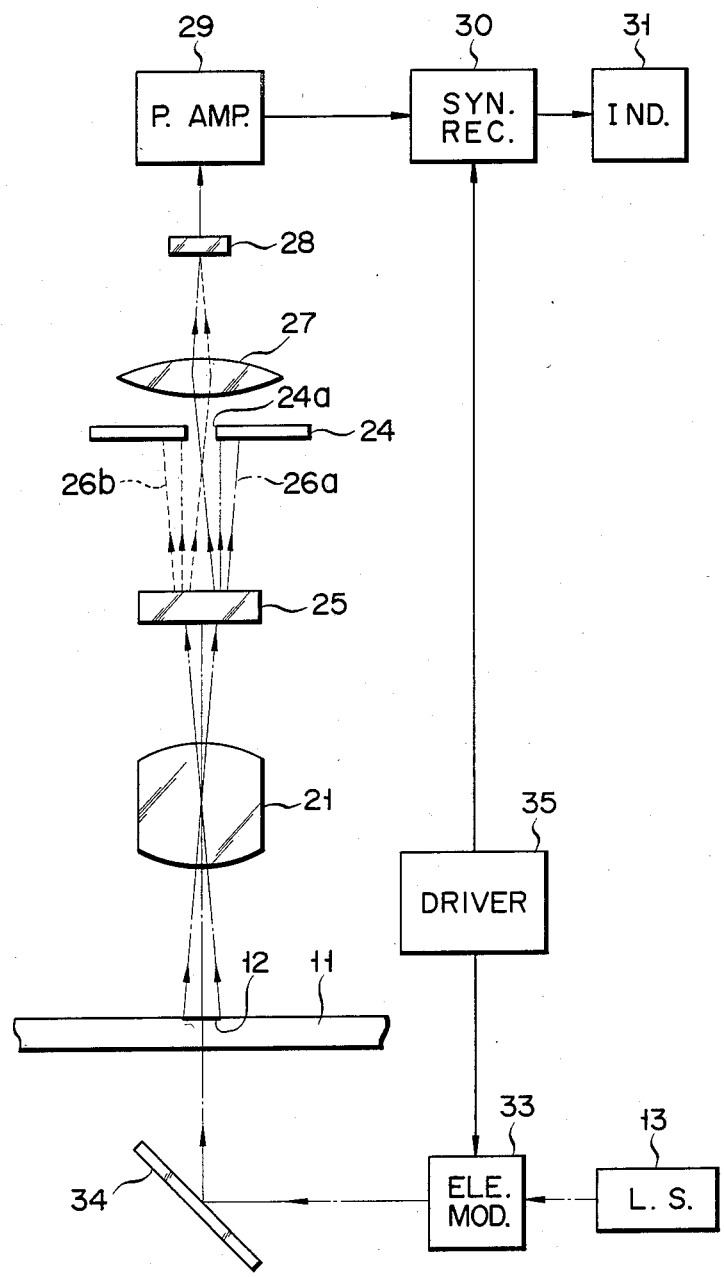
FIG. 4 shows a schematic diagram of a second embodiment of a photoelectric microscope of the fixed-slit type according to the present invention.
Figure 5:
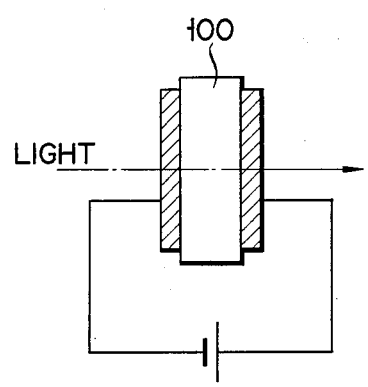
FIGS. 5 and 6 respectively show schematic views of a Pockels cell and Kerr cell.
Figure 6:
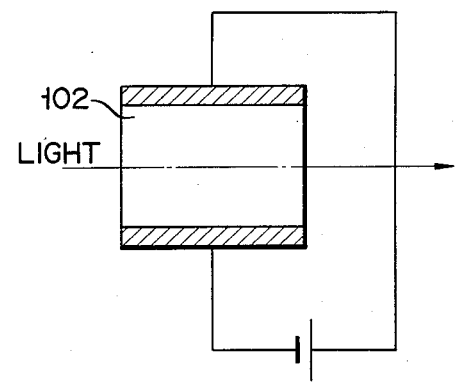
Figure 7:
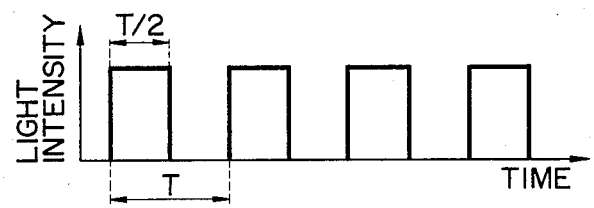
FIG. 7 shows a signal waveform of a voltage signal applied to an electrooptic modulator used in the embodiment of FIG. 4.

FIG. 4 shows a schematic diagram of a second embodiment of the present invention. Like reference numerals are used to designate like or equivalent portions in FIG. 1. The major difference of this embodiment from that mentioned above resides in the use of an electrooptic modulator 33. The electrooptic modulator 33 may be a Pockels cell in which an electric field directed as shown in FIG. 5 is applied to a crystal of KDP (potassium dihydrogen phosphate) 100, for example, to allow light to pass in the direction of the electric field, or a Kerr cell in which an electric field with a direction as shown in FIG. 6 is applied to nitrobenzene 102 to allow light to pass in the direction normal to the electric field. The electrooptic modulator 33 can form polarized light beams whose planes of polarization are orthogonal to each other by intermittently applying a fixed voltage dependent on a characteristic of a transparent medium, i.e., a halfwave voltage. When an AC voltage with a rectangular waveform, which has a duty factor of 50% and a peak value of the halfwave voltage is used, as shown in FIG. 7, light beams polarized normal to each other are derived from the electrooptic modulator 33 at fixed periods. The pair of polarized light beams illuminating the scale plate 11 through the reflector 34 respectively correspond to the polarizing directions D and E of the polarized light beams P' and Q'. In the figure, reference numeral 35 designates a driver for applying the rectangular wave AC voltage of the 50% duty factor to the electrooptic modulator 33. The output voltage of the driver 35 is applied as a reference signal to the synchronous rectifier 30.

With such an arrangement, using the irradiation mechanism comprised of the light source 13, the electrooptic modulator 33 and the reflector 34, a pair of polarized light beams polarized orthogonal to each other are allowed to alternately illuminate the linear pattern 12 on the scale plate 11 at fixed periods, as in the above-mentioned embodiment. Therefore, this embodiment can achieve useful effects comparable with those of the first embodiment. In addition, there is no need for the mechanical rotating components, for example, the chopper 20. This leads to a simplified construction of the photoelectric microscope.

Figure 9:
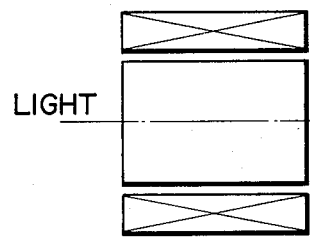
FIGS. 9 and 10 respectively show schematic views of a Farady cell and a Cotton-Mouton cell.
Figure 10:
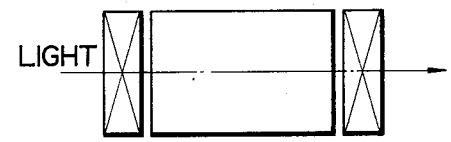
Figure 8:
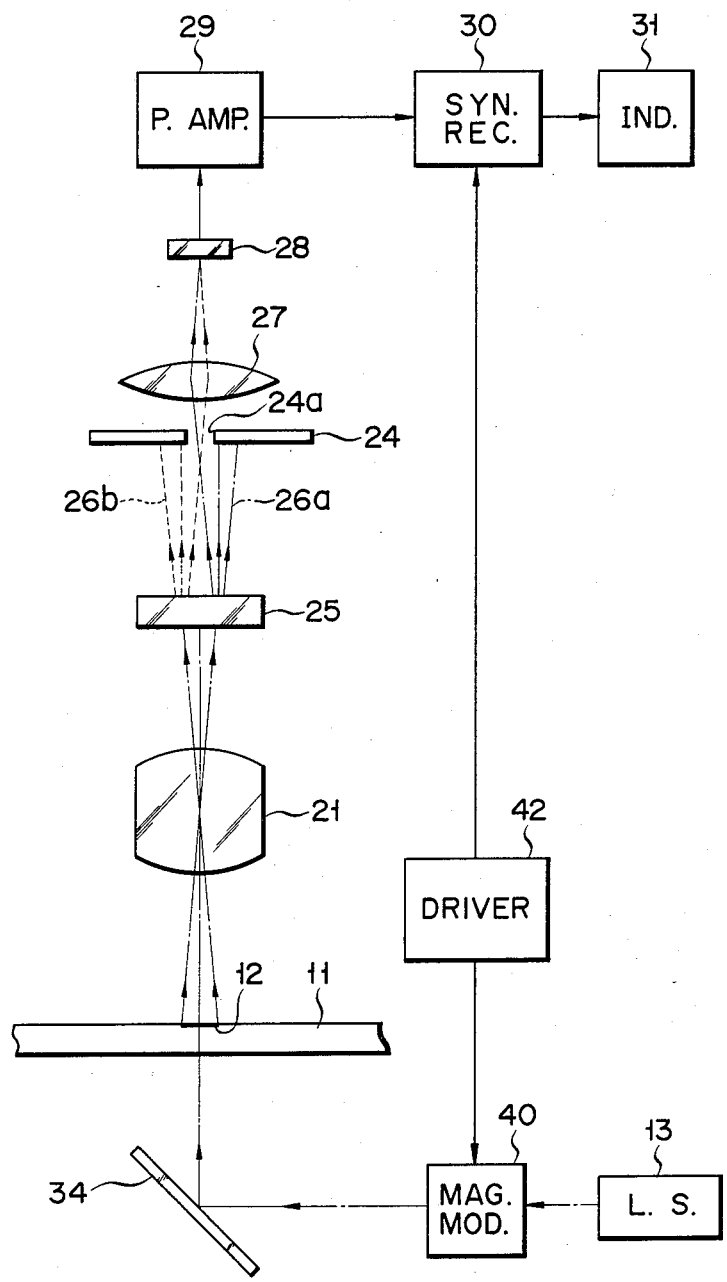
FIG. 8 shows a schematic diagram of a third embodiment of a photoelectric microscope of the fixed-slit type according to the present invention.

A third embodiment of a photoelectric microscope according to the present invention will now be described referring to FIG. 8. This embodiment uses a magnetooptic modulator 40 which changes the polarizing direction of light according to the application of a magnetic field. The magnetooptic modulator 40 may be Farady cell which controls a polarizing state with a magnetic field applied in the travelling direction of light, as shown in FIG. 9, or a Cotton-Mouton cell which controls a polarizing state with a magnetic field applied in a direction normal to the light-travelling direction, as shown in FIG. 10. The magnetooptic modulator 40 is driven by a driver 42. The remaining construction of this embodiment is substantially the same as that of the second embodiment shown in FIG. 4.

Figure 11:
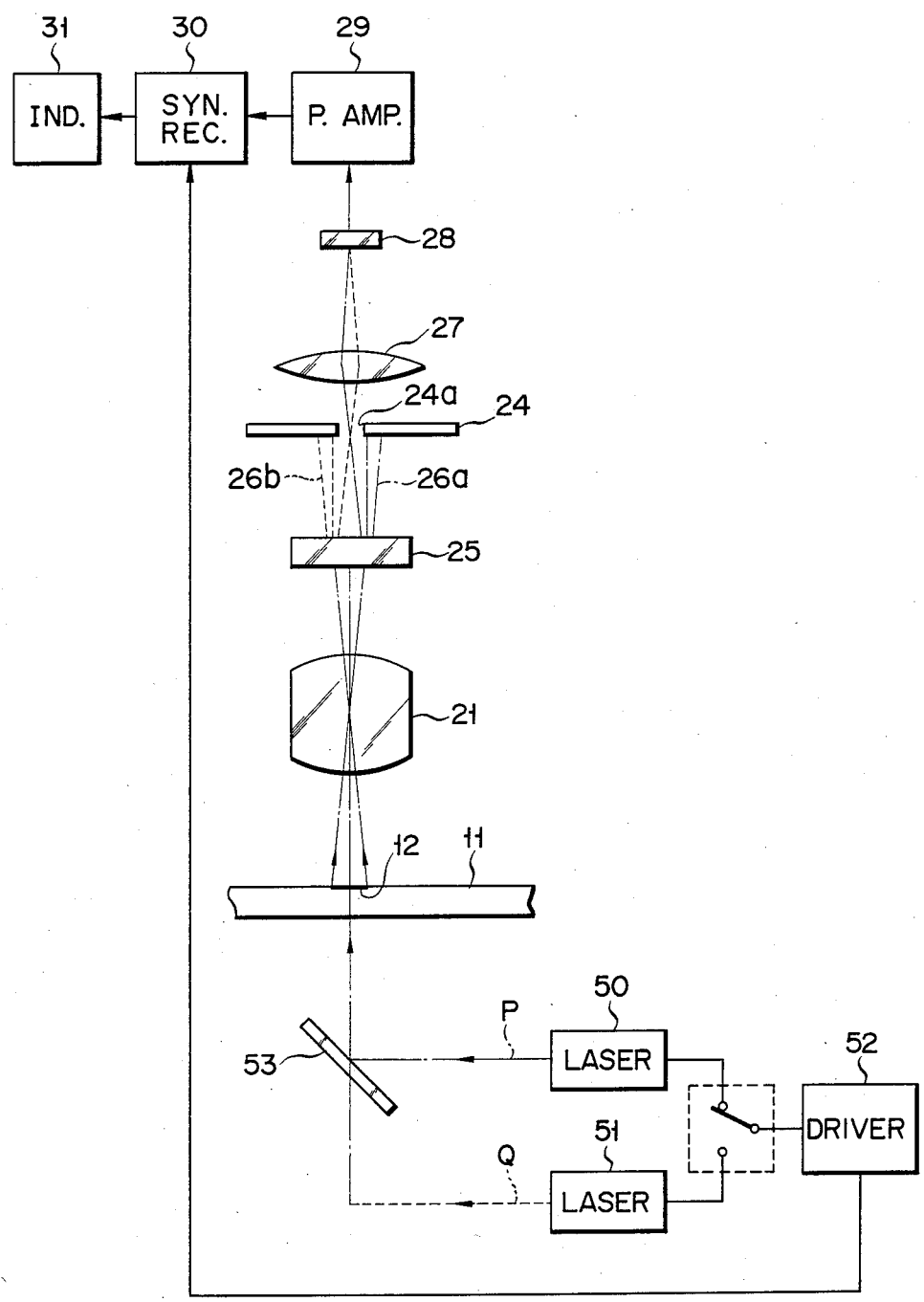
FIG. 11 shows a schematic view of a fourth embodiment of a fixed-slit type photoelectric microscope according to the present invention.

A fourth embodiment of a photoelectric microscope according to the present invention will be described with reference to FIG. 11. This embodiment uses first and second laser generators 50 and 51 for generating polarized light beams P and Q having planes of polarization which are orthogonal to each other. The first and second lasers 50 and 51 generate the polarized light beams P and Q, respectively. A driver 52 controls the timings of the polarized light beams P and Q generated by the laser generators 50 and 51, and the polarized light beams P and Q are generated alternately. The polarized light beam P is reflected by the half mirror 53 to illuminate the linear pattern 12. The polarized light beam Q passes through the half mirror 53 to illuminate the linear pattern 12. The remaining construction of this embodiment is substantially the same as that of the second embodiment, and no further elaboration will be given here.

It is evident that this invention is not limited to the above-mentioned embodiments. For example, the irradiation mechanism which is disposed below the object under inspection in these embodiments may also be arranged above the object, and used as a reflecting irradiation system. The polarizing plates 18 and 19, as the polariscopes, may be replaced by devices to change natural light beam into linear polarized light, for example, polarizing prisms. The optical deflection elements used in the above-mentioned embodiments, i.e., a Savart plate, may be any elements having a deflecting function. The optical deflection elements may also be disposed between the objective 21 and the scale plate 11. It should be understood that this invention may be variously changed and modified within the scope of the invention.

What is claimed is:

1. A fixed-slit type photoelectric microscope for inspecting an object comprising:
    irradiating means for irradiating a linear pattern of the object alternately by a pair of polarized light beams having planes of polarization orthogonal to each other;
    image formation means for forming an image of said linear pattern by the pair of polarized light beams illuminating said linear pattern;
    optical deflecting means for deflecting the pair of polarized light beams passed through said image formation means in different directions;
    single slit means fixed at a point conjugate to said linear pattern with respect to said image formation means, different portions of said slit means being selectively illuminated by the pair of polarized light beams deflected by said optical deflecting means;
    photoelectric converting means for converting the pair of polarized light beams transmitted through said slit means into an electrical signal;
    synchronous rectifying means for rectifying the electrical signal from said photoelectric converting means in synchronism with the alternate irradiation of the pair of polarized lights by said irradiating means, thereby producing a rectified signal; and
    indicating means for visualizing said rectified signal.

2. A fixed-slit type photoelectric microscope according to claim 1, wherein said irradiating means includes a light course, a pair of polariscopes for polarizing the light beam from said light source in directions orthogonal to each other, chopper means for chopping a pair of polarized light beam derived from said polariscopes, and optical means for illuminating the linear pattern disposed on said object with the polarized light beam selected by said chopper means.

3. A fixed-slit type photoelectric microscope according to claim 2, wherein said optical deflecting means is a Savart plate.

4. A fixed-slit type photoelectric microscope according to claim 1, wherein said irradiating means includes a light source, electrooptical conversion means for polarizing the light beam from said light source into polarized light beams alternately directed orthogonal to each other, and optical means for illuminating the linear pattern on said object with the polarized light beams formed by said electrooptical conversion means.

5. A fixed-slit type photoelectric microscope according to claim 4, wherein said optical deflecting means is a Savart plate.

6. A fixed-slit type photoelectric microscope according to claim 1, wherein said irradiating means includes a light source, magnetooptical converting means for polarizing light from said light beam source into polarized light beams alternately directed orthogonal to each other, and optical means for illuminating the linear pattern disposed on said object with the polarized light beams formed by said magnetooptical converting means.

7. A fixed-slit type photoelectric microscope according to claim 6, wherein said optical deflecting means is a Savart plate.

8. A fixed-slit type photoelectric microscope according to claim 1, wherein said irradiating means includes first laser means for generating polarized light beam with a given plane of polarization, second laser means for generating polarized light beam with a plane of polarization orthogonal to the plane of polarization of the polarized light beam from said first laser means, selecting means for periodically selecting a pair of polarized light beams from said first and second laser means, and optical system means for illuminating the linear pattern on said object under inspection with the polarized light beam selected by said selecting means.

9. A fixed-slit type photoelectric microscope according to claim 8, wherein said optical deflecting means is a Savart plate.

10. A fixed-slit type photoelectric microscope for inspecting an object comprising:

irradiating means for irradiating a linear pattern of the object alternately by a pair of polarized light beams having planes of polarization orthogonal to each other;

optical deflecting means for deflecting the pair of polarized light beams from said linear pattern in different directions;

image formation means for forming an image of said linear pattern by the pair of polarized light beams deflected by said optical deflecting means;

single slit means fixed at a point conjugate to said linear pattern with respect to said image formation means, different portions of said slit means being selectively illuminated by the pair of polarized light beams transmitted through said image formation means;

photoelectric converting means for converting the pair of polarized light beams transmitted through said slit means into an electrical signal;

synchronous rectifying means for rectifying the electrical signal from said photoelectric converting means is synchronism with the alternate irradiation of the pair of polarized light beams by said irradiating means, thereby producing a rectified signal; and indicating means for visualizing said rectified signal.

11. A fixed-slit type photoelectric microscope according to claim 10, wherein said irradiating means includes a light source, a pair of polariscopes for polarizing the light beam from said light source in directions orthogonal to each other, chopper means for chopping a pair of polarized light beams derived from said polariscopes, and optical means for illuminating the linear pattern disposed on said object with the polarized light beam selected by said chopper means.

12. A fixed-slit type photoelectric microscope according to claim 11, wherein said optical deflecting means is a Savart plate.

13. A fixed-slit type photoelectric microscope according to claim 10, wherein said irradiating means includes a light source, electrooptical conversion means for polarizing the light beam from said light source into polarized light beams alternately directed orthogonal to each other, and optical means for illuminating the linear pattern on said object with the polarized light beams formed by said electrooptical conversion means.

14. A fixed-slit type photoelectric microscope according to claim 13, wherein said optical deflecting means is a Savart plate.

15. A fixed-slit type photoelectric microscope according to claim 10, wherein said irradiating means includes a light source, magnetooptical converting means for polarizing the light beam from said light source into polarized light beams alternately directed orthogonal to each other, and optical means for illuminating the linear pattern disposed on said object with the polarized light beams formed by said magnetooptical converting means.

16. A fixed-slit type photoelectric microscope according to claim 15, wherein said optical deflecting means is a Savart plate.

17. A fixed-slit type photoelectric microscope according to claim 10, where said irradiating means includes first laser means for generating polarized light beam with a given plane of polarization, second laser means for generating polarized light beam with a plane of polarization orthogonal to the plane of polarization of the polarized light beam from said first laser means, selecting means for periodically selecting a pair of polarized light beams from said first and second laser means, and optical system means for illuminating the linear pattern on said object with the polarized light beam selected by said selecting means.

18. A fixed-slit type photoelectric microscope according to claim 17, wherein said optical deflecting means is a Savart plate.

* * * * *